United States Patent
Pareglio et al.

(10) Patent No.: US 9,439,026 B2
(45) Date of Patent: Sep. 6, 2016

(54) METHOD AND SYSTEM FOR COMMUNICATION BETWEEN MACHINE TO MACHINE M2M SERVICE PROVIDER NETWORKS

(75) Inventors: Barbara Pareglio, Breda (NL); Hendrikus Adrianus Antonia Maria van der Velden, Eindhoven (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/427,062

(22) PCT Filed: Sep. 10, 2012

(86) PCT No.: PCT/EP2012/067609
§ 371 (c)(1),
(2), (4) Date: Apr. 1, 2015

(87) PCT Pub. No.: WO2014/037054
PCT Pub. Date: Mar. 13, 2014

(65) Prior Publication Data
US 2015/0245161 A1    Aug. 27, 2015

(51) Int. Cl.
*H04W 4/00* (2009.01)
*H04W 60/00* (2009.01)
*H04W 72/04* (2009.01)

(52) U.S. Cl.
CPC .............. *H04W 4/005* (2013.01); *H04W 60/00* (2013.01); *H04W 72/04* (2013.01)

(58) Field of Classification Search
CPC .................................................. H04W 4/005
USPC ...................................................... 455/435.1
See application file for complete search history.

(56) References Cited

FOREIGN PATENT DOCUMENTS

| WO | 2011112683 A1 | 9/2011 |
|---|---|---|
| WO | 2012118711 A2 | 9/2012 |

OTHER PUBLICATIONS

Russell, Jr., Paul, "M2M SCL Discovery Procedures", European Telecommunications Standards Institute M2M#14bis Meeting, ETSI/M2M(11) 0109, InterDigital Communications, Mar. 28-Apr. 1, 2011, 1-8.

(Continued)

*Primary Examiner* — Thomas Lett
(74) *Attorney, Agent, or Firm* — Murphy, Bilak & Homiller, PLLC

(57) ABSTRACT

Machine-to-Machine (M2M) communication has been described for communication in a single network in among others publications from the European Telecommunications Standards Institute (ETSI). The publications describe a single network with defined entities, a resource structure and protocols. According to the invention, a solution is described for communication between entities residing in different M2M networks. Entities residing in a first M2M network requiring information of an entity in another second M2M network submit a request with a target ID pointing to the entity in the second M2M network. The request is forwarded to the network node of the first network. The network node of the first network checks whether the target ID matches with an announced resource in the network node of the first network. On a match the request is routed towards the network node of the second M2M network according to an address available in a REstful structure comprising the announced resource. The network node of the second network routes the request further towards the second entity. On reception of the request the second entity processes the request and returns a reply via the path created by the previous steps.

12 Claims, 12 Drawing Sheets

(56) References Cited

OTHER PUBLICATIONS

Unknown, Author, "Machine-to-Machine communications (M2M); Functional architecture", ETSI TS 102 690 V1.1.1, Oct. 2011, 1-280.

Unknown, Author, "Machine-to-Machine communications (M2M); Functional architecture", ETSI TS 102 690 V2.0.8, Aug. 2012, 1-293.

Unknown, Author, "Machine-to-Machine communications (M2M); M2M service requirements", ETSI TS 102 689 V1.1.1, Aug. 2010, 1-34.

Unknown, Author, "Machine-to-Machine communications (M2M); mla, dla and mld interfaces", ETSI TS 102 921 V1.1.1, Feb. 2012, 1-538.

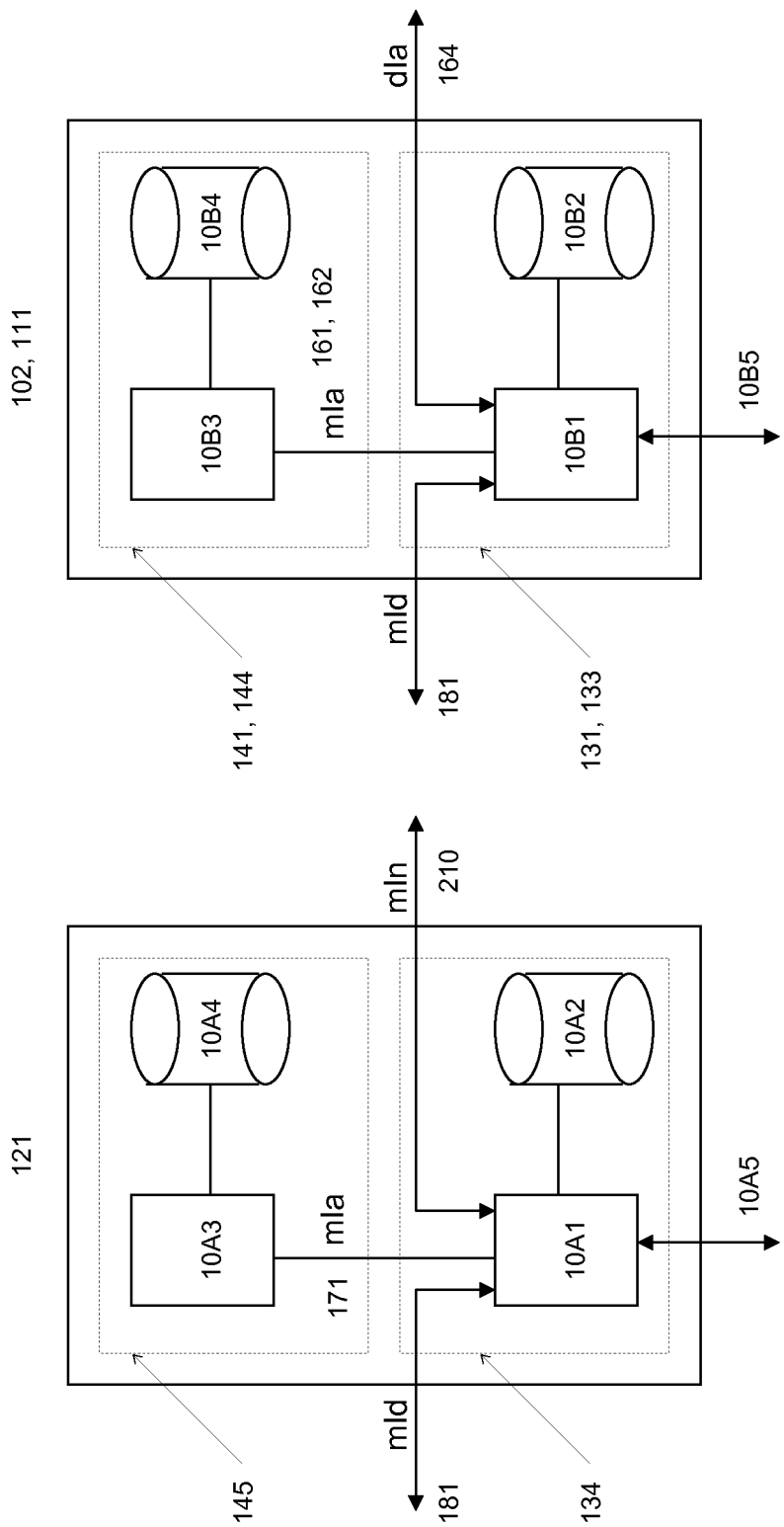

METHOD AND SYSTEM FOR COMMUNICATION BETWEEN MACHINE TO MACHINE M2M SERVICE PROVIDER NETWORKS

FIELD OF THE INVENTION

The present invention relates generally to enablement of a communication network comprising devices that communicate without human intervention. More particularly, the present invention facilitates a method and system for initialising communication in a Machine-to-Machine (M2M) environment in an efficient way.

BACKGROUND OF THE INVENTION

As network availability in devices spreads, and network access coverage increases, there is an increasing demand to create a network of connected things or devices. Where the first drive of the telecommunications industry was to connect locations to each other, and ask users to travel to one of the connected locations, and the second drive of the industry was creating mobile connections so that people could be connected regardless of locations, a third phase of connectivity is being entered. In this third phase, there is an interconnection of devices.

Whether these devices are mobile, such as actuators in transportation systems, or fixed in locations such as sensors on a utility meter, devices are being connected to each other and to network applications or services.

However, a problem is foreseen in that as the number of devices will increase, the problem of managing these devices will also grow. Furthermore, the manner in which the devices are connected to a network can affect how they are managed and communicate.

As among one of the recognized authorities on standardization of communication technology, the European Telecommunications Standards Institute (ETSI), has taken the initiative to develop standards to support industry for enabling ease of connectivity between the devices i.e. sensors and actuators, as well as applications and services.

By means of standards, innovation across industry is facilitated, enabling exposure of data and information as well of provision of services.

ETSI has defined a standard for machine-to-machine (ETSI M2M) communication where devices communicate and exchange information via a defined structure of database-like resources. The standard is described in a.o. the following documents:

TS 102 689—Service Requirements: which provide a high level requirements for an M2M Service Layer TS 102 690—Functional Architecture. The architecture which entities are required as to deploy device communication and management in an M2M network.

TS 102 921—mIa, dIa and mId interfaces. The document provides the protocol specification for the three reference points mIa, dIa and mId.

The ETSI M2M suite, comprising the standards listed above, provides a Machine-to-Machine (M2M) architecture with a generic set of capabilities for M2M services and provides a framework for developing services independently of the underlying network.

The ETSI M2M suite is generally based on a number of defined physical entities and a number of defined resources. The resources comprise information to be shared or exchanged, and are organised in so called Service Capability Layers (SCLs), according to a REpresentational State Transfer (RESTful) architecture style.

The RESTful architecture style, generally applied by ETSI M2M, represents a tree wherein the SCL maintains a resource structure where the information to be shared or exchanged is stored and updated.

Communication to and from the resources, comprised by the SCLs, is defined by procedures over dedicated interfaces, called "reference points".

The entities forming a network are organised in a pyramid like structure where (multiple) devices (sensors and actuators) form the basis and a Network node, network domain server, comprising a Network Service Capability Layer (NSCL) forms the top of the pyramid.

The device might be a very simple device, such as a contact switch sensor, only able to provide on-off data, or an actuator such as a relay to turn on or off a heating element. On the other extreme a device can be a complex remote sensor with a local application that provides compressed and encrypted strings of data on e.g. received radiation units on request.

ETSI M2M has defined the concepts of an M2M application and an M2M Service Capability Layer (SCL), being processing units comprised by physical entities. The application has to register over a defined reference point with an SCL. The SCL to be registered with, called "the local SCL" in ETSI M2M terms, is either the SCL locally available in the same entity where the application resides, or if not locally available, in the first higher SCL in the pyramid.

The SCL enables an application to use the M2M communication suite. The ETSI M2M SCL can generally be seen as a database, having a defined record structure, using defined interfaces, the reference points, for communication with other SCLs and Applications, and is arranged to perform functions such as relaying information to other SCLs, store and forward functionality, expiration time handling, policy enforcement, etc.

ETSI M2M had defined (until now) a number of different entities, a Device (D and D' also known as "D prime"), a Gateway (G) and a Network node (N). The D' entity comprises an Application only. The D, G and N entities comprise an SCL an may further comprise an Application.

The G entity has been introduced to connect D' entities in a local area level. The G entity enables M2M communication to other entities in the M2M network by means of its SCL.

Multiple G entities comprising Gateway SCLs (GSCLs) and optionally Gateway Applications (GAs) could be connected to an N entity such that a pyramid-like structure is formed.

In this way a Network Application (NA) comprised by the N entity can communicate with- or control- the connected D- and G- entites.

ETSI M2M indicates that an address of a resource representing Device Application (e.g. with identifier DA1) registered with the SCL of an NSCL (e.g. with identifier NSCL1) has the identifier:

"<sclBase for NSCL1>/applications/DA1".

The pyramid-like topological structure of the entity which hosts DA1 is not represented in this identifier. The sequence is independent from underlaying physical networks.

Device applications are generally understood as applications that in case of a sensor, retrieve the data of the sensor and store (or "update" in M2M terms) the data into the resource of the one or more SCLs where the application has been registered to. In case of an actuator, the application may e.g. read the resource of the SCL where the application has been registered with, or reacts on a notification message, and controls the actuator according to the value indicated in the resource read or notification received respectively.

Gateway- and Network applications are understood as applications that process data received from Device Applications and submit requests to Device Applications to be executed.

There is a substantial demand to connect numerous devices which may connect via fixed and cellular data networks as well as wireless network interface such as WiFi (IEEE 802.11).

However not all devices can be expected to reside in a single network, operated by a single M2M provider, just as in the ETSI M2M standards listed above is presented.

A problem is raised in how devices can initialise and establish communication when different M2M networks are maintained by different M2M service providers, having no D entities connected via the same G or N entities.

As an example of the problem stated, a solution is required for a situation where an entity in a first M2M Service provider network has to retrieve information that is stored in a resource residing in one or more entities of a second M2M Service Provider network.

SUMMARY OF THE INVENTION

It is an object of the present invention to provide a method and system to enable communication between Machine-to-Machine (M2M) devices, applications or services that do not belong to the same network M2M network.

A solution is presented below for allowing devices attached to a specific M2M Service Provider network to utilize service and communicate to devices from other M2M networks belonging to one or more other M2M Service Providers.

The invention is explained in an example according to a REpresentational State Transfer (RESTful) architecture style, applied by the European Telecommunications Standards Institute (ETSI), for M2M communication.

The solution to the problem is discussed as a method where a first entity, being an application or an entity, residing in a first network needs to communicate, e.g. retrieve or exchange information, with a second entity, residing a second, different network.

Both networks are M2M networks, having a topologically pyramid-like structure with a single network node on top of the network. Each of the M2M networks, comprise the network node and one or more entities and applications which are communicatively connected to eachother according to the topologically pyramid-like structure.

The entities that support the communication, comprise resources for exchanging information, are arranged in a tree-like structure.

The explanation of the solution is based on the rules:

All communication between both networks has to pass network nodes of the M2M networks, each having a link to the other network node.

Each resource has a determined location in the tree-like structure, and a determined meaning in the entity, thereby enabling addressing.

Further as a condition which took already place before the solution is applied, registration within the M2M networks was performed.

The applications and entities within each network have to register to each other in an upward direction in the pyramid-like structure until the network node on the top has received registrations of the applications and entities risiding directly (one step) below under the network node. The remaining applications and entities in the M2M network that are not registered with the network node are registered with their superior entity.

When the first entity or application transmits a request addressed for the second entity in the direction of a first network node of the first network, this first network node receives the request comprising an identifier identifying the addressed second entity.

The first network node checks its resources for a matching reference, where this reference is stored in a resource of the first network node, with the identified addressed of the second entity, from the request.

When the first network node has found a match, the first network node retrieves the network node of a second network indicated as the network node from which the request to the resource comprising the matched reference was received.

The first network node forwards the request to the retrieved second network node which subsequently forwards the request to the second entity.

The second entity receiving the request, processes the request and responds to the first entity via a path created by the previous steps.

The first network node in the first M2M network as defined above with the pyramid-like topology, having resources for exchanging information, arranged in a tree-like structure, receives a request from an application or entity in a first network where the request comprises an identifier identifying an addressed second entity of a second network wherein the second entity is not registered to the first network node.

The first network node checks its resources for a matching reference, where the reference is comprised by the first network node's resources, with the identified addressed second entity.

On a match, the first network node subsequently routes the request to a network node of the second network indicated as the network node from which the request to the resource comprising the matched reference was received.

The first network node routes the request according to routing information stored in the resource of the first network node, representing a registration from the second network node.

The term "resource" should generally be understood as one or more memory locations in an SCL, enabled for being read and updated according to the setting of attributes, defining which entity may read or update.

The term "update" should generally be understood as storing one or more values into a resource.

The elucidation for the method claims does also apply for the corresponding embodiment of the listed methods to the system entities as claimed.

The method, node and system presented has the advantage of re-using the concept of announcement for spreading the knowledge of remote resources.

These and other embodiments according to the present invention are now illustrated in more detail with reference to the enclosed drawings.

BRIEF DESCRIPTION OF THE DRAWINGS

FIG. 10A illustrates schematically a node comprising an NSCL.

FIG. 10B illustrates schematically a node comprising an DSCL or GSCL.

DETAILED DESCRIPTION

Without restrictions to the scope of the invention, in order to provide a thorough understanding of the present invention, the invention is presented against the background and within the scope of the current published standards suite of the European Telecommunications Standards Institute (ETSI), regarding Machine-to-Machine (M2M) communication, referred here as ETSI M2M.

However, the present invention may be applied in any context of a device-to-device, or M2M communication deploying a RESTfull style architecture, deployed in networks having a pyramid like topology. Apart from the ETSI M2M initiative, the proposed solution can be applicable to the one M2M initiative or the M2M or Internet of things initiative by the Telecommunications Industry Association's (TIA).

Figure 1:
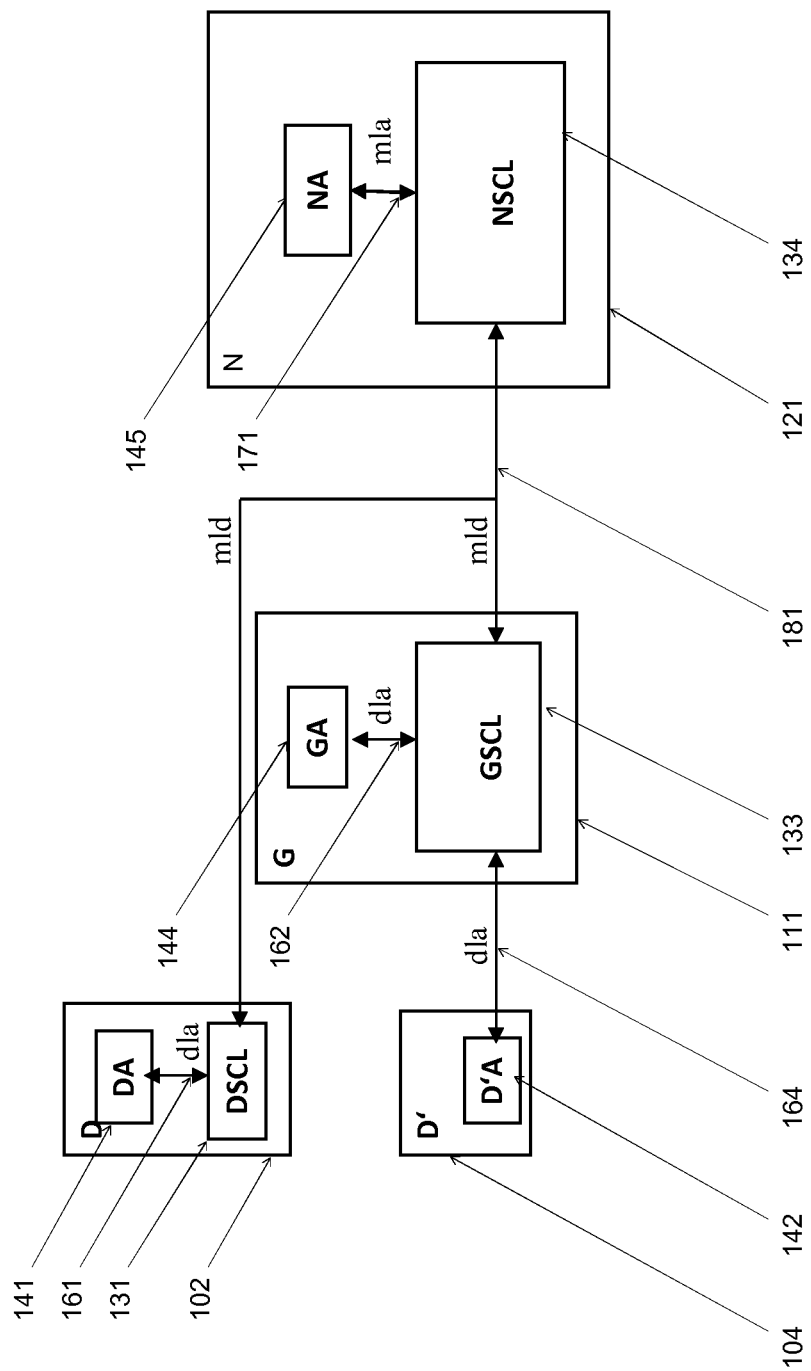
FIG. 1 illustrates schematically a network architecture with entities organized in a pyramid like topology.

FIG. 1 illustrates schematically a network architecture with entities organized in a pyramid like topology.

For the remainder of this description abbreviations are used wherein;
SCL: Service Capability Layer
DSCL: Device Service Capability Layer
GSCL: Gateway Service Capability Layer
NSCL: Network Service Capability Layer
DA: Device Application
GW: Gateway Application
NA: Network application The architecture defined by ETSI M2M assumes that physical entities, such as Devices 102, 104, Gateway 111 and Network node 121 belong to a single M2M service provider.

Applications 141, 142, 144, 145 and the Service Layer Capabilities DSCL 131, GSCL 133 and NSCL 134, belong to a single M2M Service Provider. The ETSI M2M standard specification does not describe how an application or an SCL belonging to the M2M Service Provider can obtain information produced by an application or SCL that riside on a second different M2M Service Provider serving a different M2M network.

FIG. 1 also presents the defined reference points (interfaces) between Applications and SCLs and between SCLs.

Reference point "dIa" 161, 162, and 164 refers to the interface between a Device- or Gateway-Application (DA, GA) and an SCL.

Reference point "mIa" 171 refers to the interface between the Network Application (NA) 145 and the NSCL 134.

Reference point "mId" 181 refers to the interface between DSCL/GSCL and the NSCL 134.

FIG. 1 depicts only a minimum number of entities that are required to explain the solution. It should be realized that an M2M network might comprise numerous Gateway and Device entities organised in a pyramid like structure.

It should be regarded that Physical entities e.g. 102, 104, 111, 121 might comprise applications and/or SCLs for other M2M providers.

For the explanation of the invention it is regarded that entities only comprise applications and/or SCLs of one M2M service provider.

Figure 2:
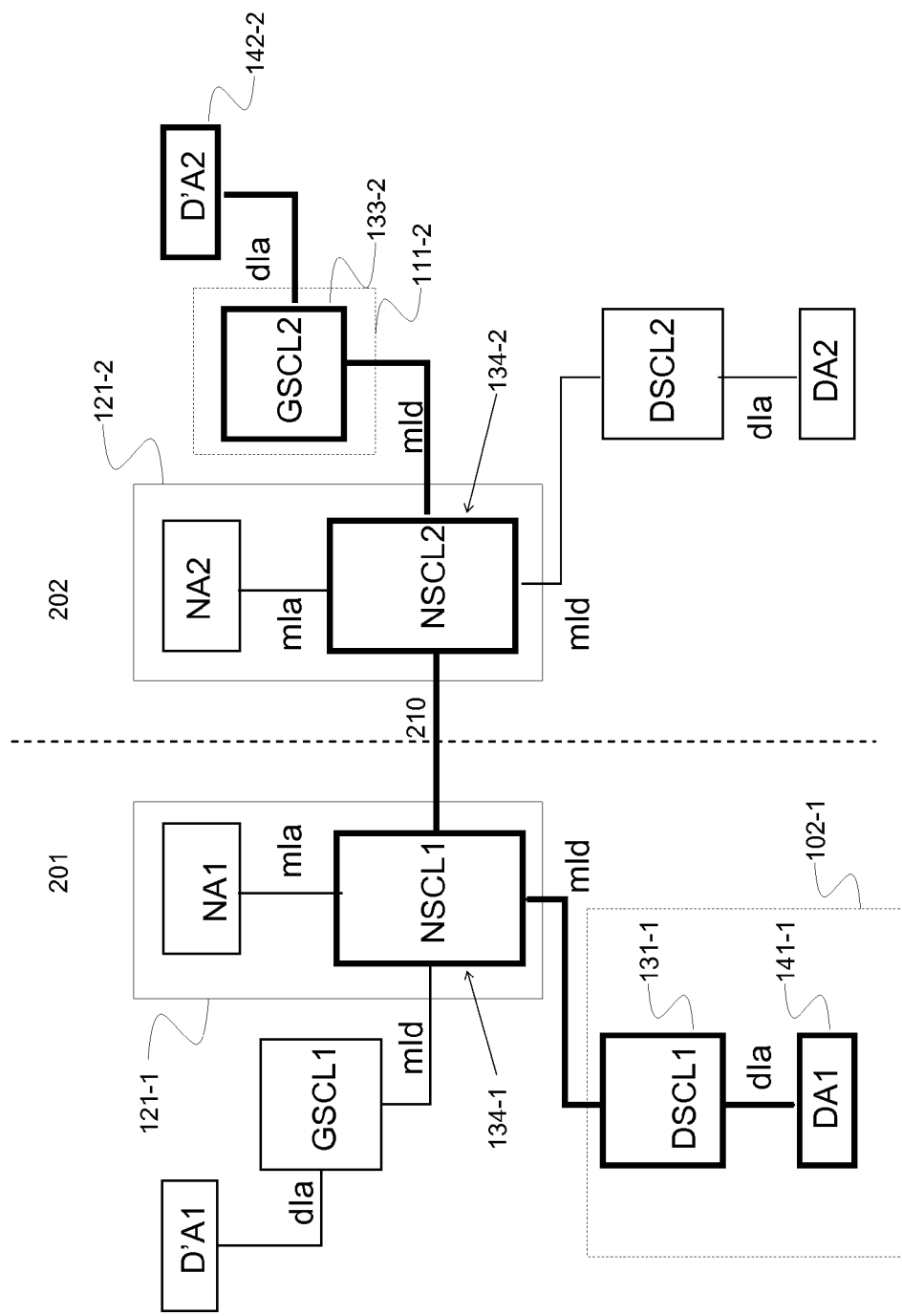
FIG. 2 illustrates schematically a network architecture with more than one independent ETSI M2M network maintained by two different M2M providers.

FIG. 2 illustrates schematically a network architecture with more than one independent ETSI M2M network maintained by two different M2M providers.

As to indicate in which network a certain entity, Application or SCL according to FIG. 1 resides, the reference sign indicating the physical entity, application or SCL for the remainder of this description, is expressed as "XXX-Y" wherein "XXX" represents the physical entity, application or SCL corresponding to FIG. 1, and "Y" represents a network indicator where "1" represents a first network and "2" represents a second network as indicated in FIG. 2.

FIG. 2 has been generally limited to represent parts of the network of FIG. 1 that are relevant for the explanation of the solution.

A first M2M network provider maintains network 201 and a second M2M network provider maintains network 202. A connecting interface 210 is depicted, connecting bidirectionally both NSCLs 134-1 and 134-2 hosted by the network nodes 121-1 and 121-2 respectively comprised by both networks.

The Invention proposes an interface and method to have devices or applications from the first network 201, be enabled to communicate with devices or applications of network 202.

The ETSI M2M standards do not define a reference point between NSCLs.

The Invention is explained with an example problem of how to have the application 141-1, hosted by entity 102-1, have retrieve information that is stored in resources comprised by GSCL 133-2, comprised by Gateway 111-2.

The GSCL 133-2 comprises data in its RESTful data structure, related to Device Application 142-2.

Before any communication can be established, ETSI M2M requires registration procedures, as to create a structure of resources for exchanging data. Resources can be created in procedures according to attributes, defining which entity may perform which action.

Figure 3A:
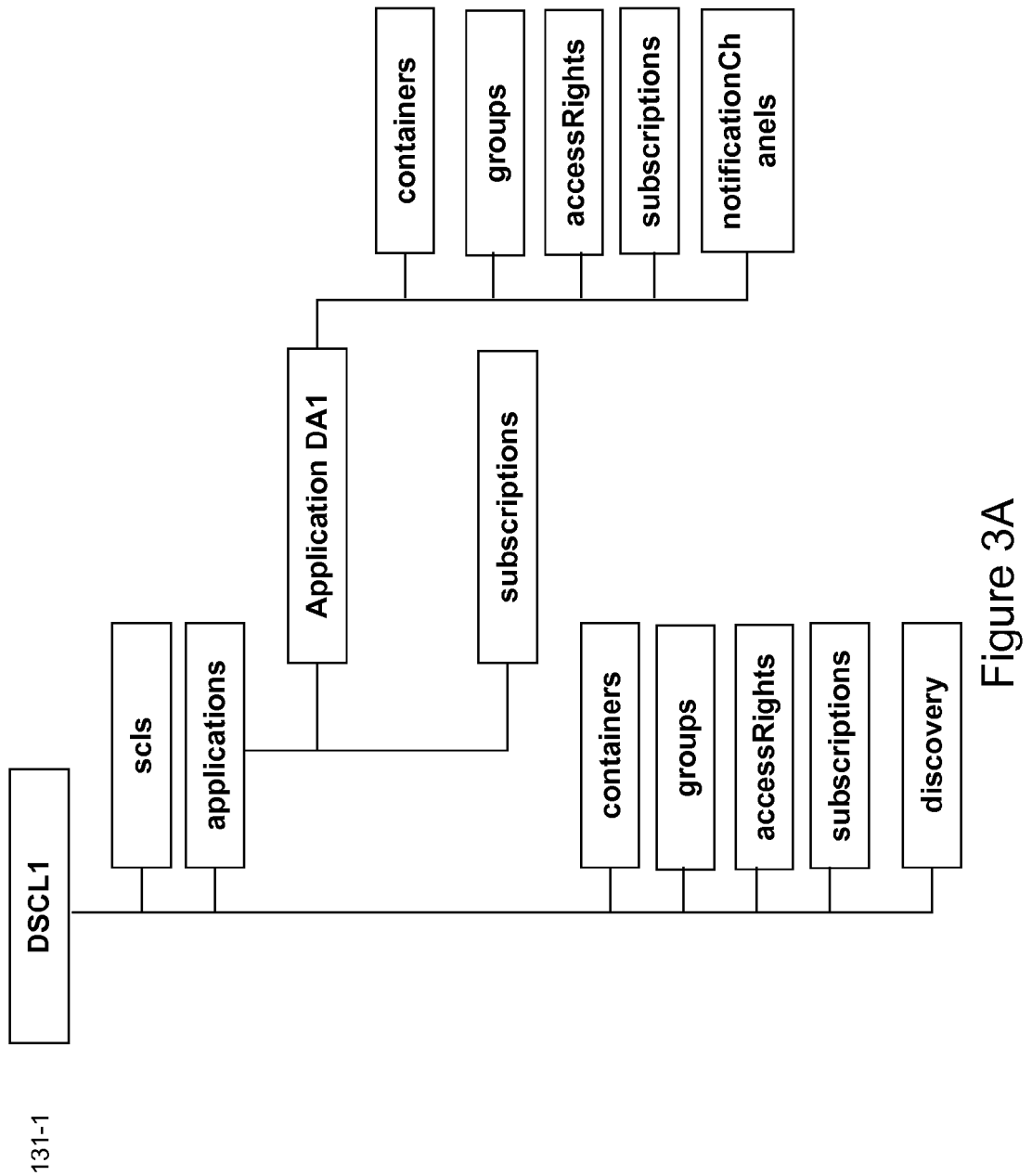
FIG. 3A illustrates schematically a part of the RESTful architecture of an DSCL where a Device Application registers.

FIG. 3A illustrates schematically a part of the RESTful architecture of an DSCL where a Device Application registers.

For illustrative simplicity the identifiers identifying SCLs and Applications and strings used in requests apply the name of the SCL according to "XSLCY", and for applications "XAY" wherein:

"X" denotes a Device "D", a Gateway "G" or a Network node "N", and "Y" denotes either the first 201 "1" or the second 202 "2" network.

FIG. 3A presents the DSCL1 131-1 tree structure comprising an applications resource representing DA1 141-1, that has been created after an application registration of DA1 141-1. The application resource DA1 comprises a resource structure, showing a.o. containers, groups etc.

The address of the application resource DA1 where the structure has been created is indicated by "<sclBase for DSCL1>/applications/DA1".

Figure 3B:
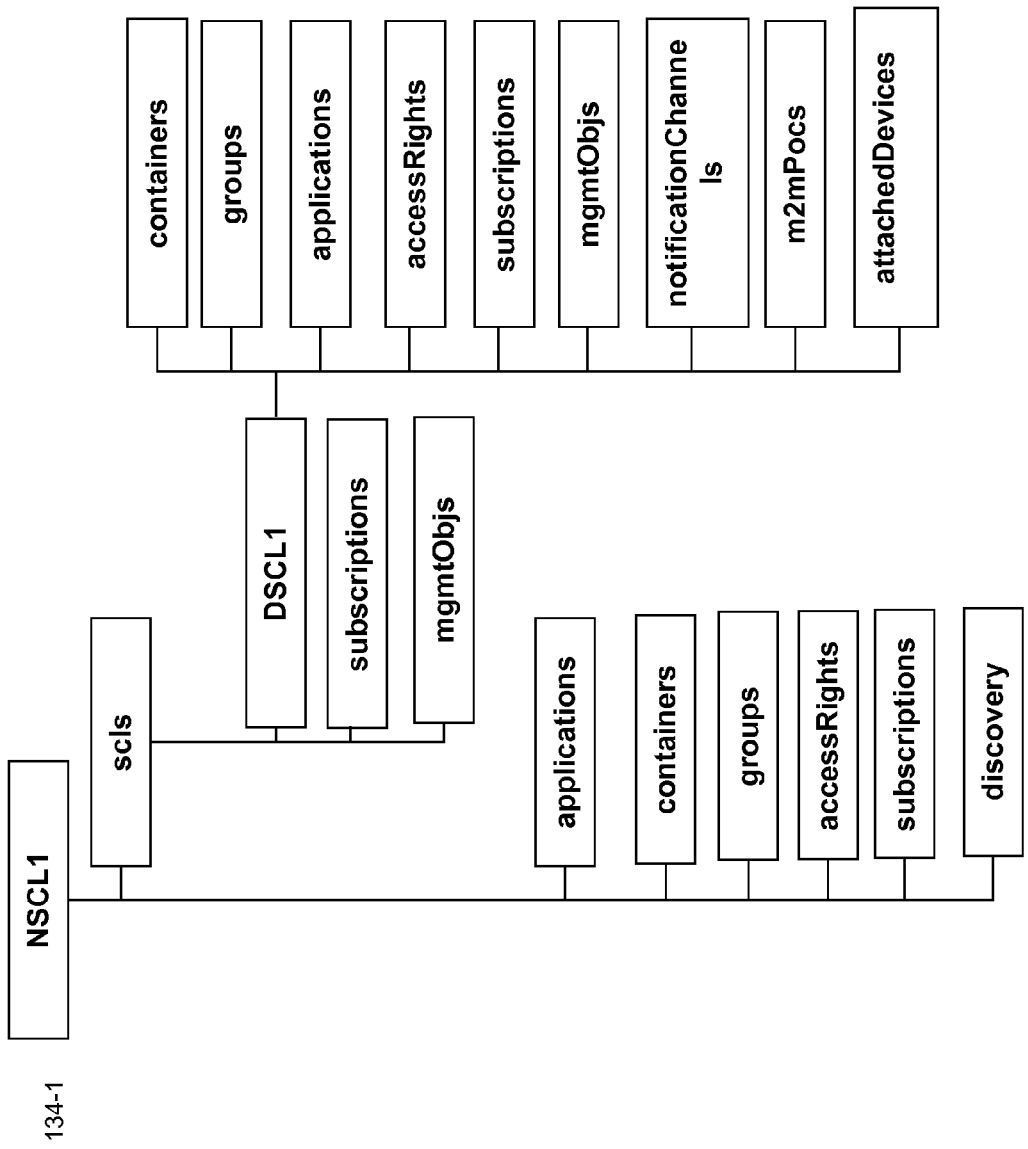
FIG. 3B illustrates schematically a part of the RESTful architecture of an NSCL where a Device SCL registers.

FIG. 3B illustrates schematically a part of the RESTful architecture of an NSCL where a Device SCL registers.

FIG. 3B shows the NSCL1 134-1 tree structure comprising an scls resource DSCL1, that has been created after registration of the DSCL 131-1 with the NSCL 134-1. The scls resource DSCL1 comprises a resource structure, showing a.o. containers, groups, etc.

The address of the scls resource DSCL1 where the structure has been created is indicated by "<sclBase for NSCL1>/scls/DSCL1".

Figure 3C:
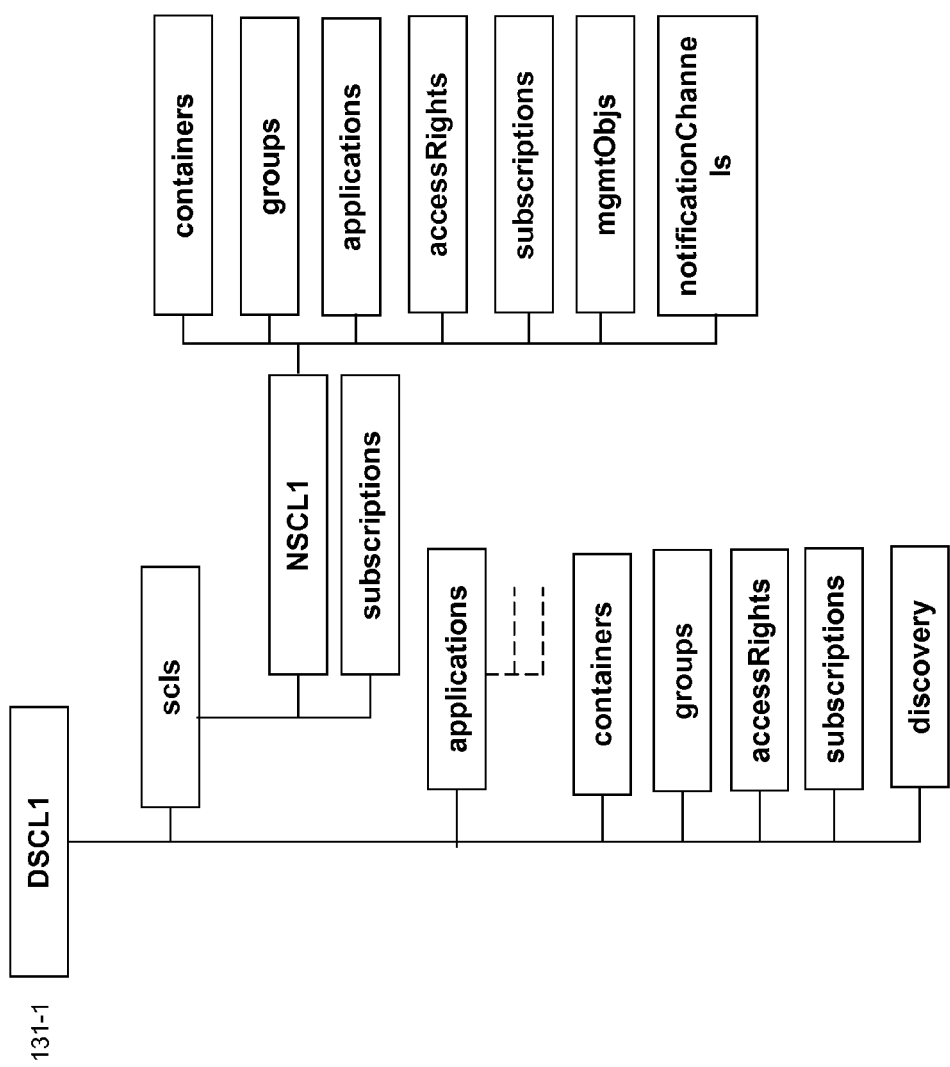
FIG. 3C illustrates schematically a part of the RESTful architecture of a DSCL, showing the result of the DSCL registration to an NSCL.

FIG. 3C illustrates schematically a part of the RESTful architecture of a DSCL, focussing on the result of the DSCL registration to an NSCL, thereby omitting a.o. the applications resource, as shown and in FIG. 3A.

FIG. 3C shows the DSCL 131-1 tree structure comprising an scls resource NSCL1, that has been created after registration of the DSCL1 131-1 with the NSCL 134-1. The scls resource NSCL1 comprises a resource structure, showing a.o. containers, groups, etc.

The registration procedures at the second network 202 provide equivalent results in the scls resources of the GSCL 133-2 and NSCL 134-2. The addresses of the resources where the structures have been created in the GSCL2 and NSCL2 respectively are indicated by "<sclBase for GSCL2>/applications/D'A2" and "<sclBase for NSCL2>/scls/GSCL2". In ETSI M2M, the SCL structure of a DSCL is equivalent to an SCL of a GSCL. As such the SCL structure of DSCL1 131-1 is equivalent to GSCL2 133-2.

Figure 4:
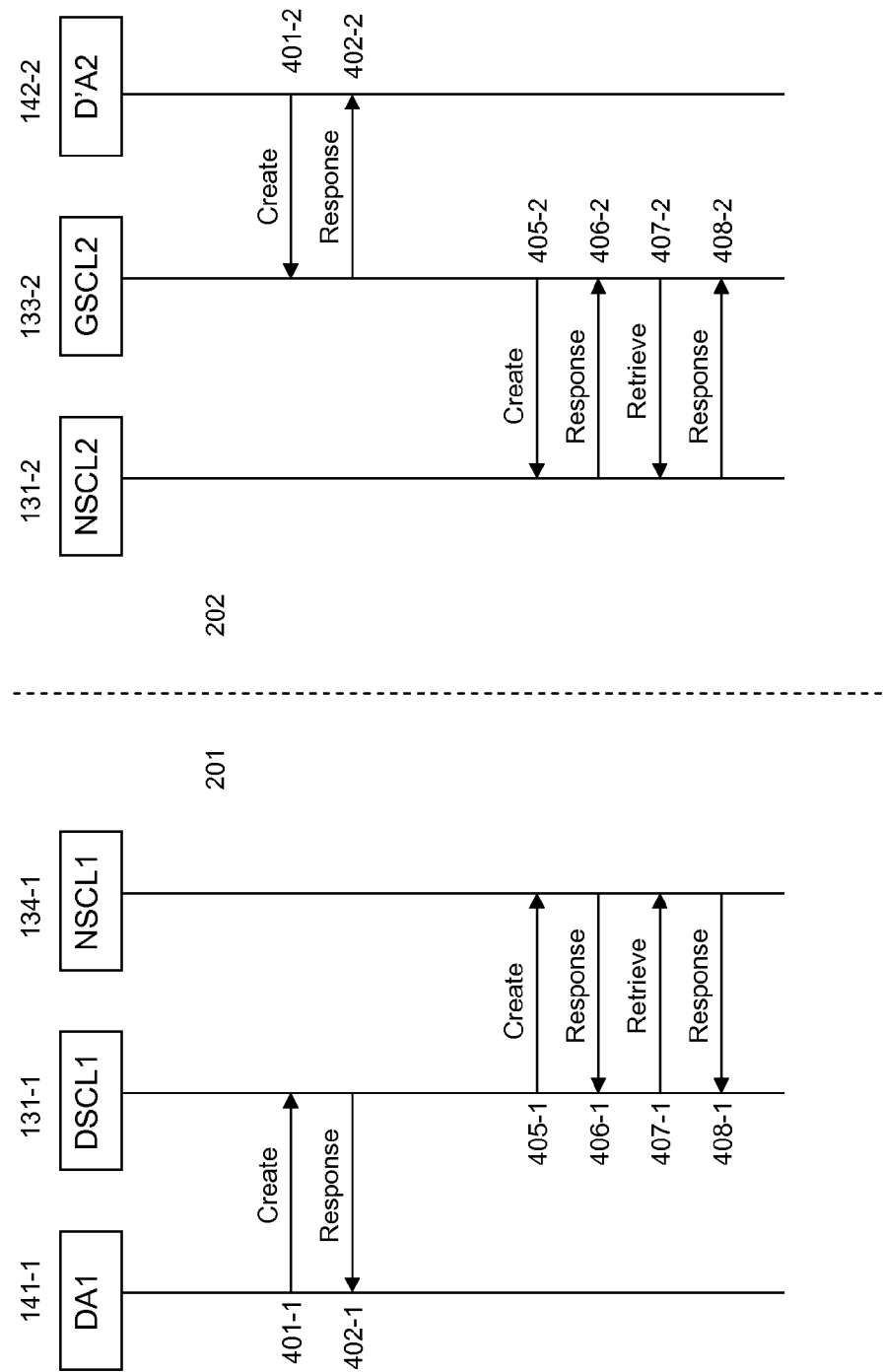
FIG. 4 illustrates schematically registration procedures at the first and second networks, maintained by two different M2M providers.

FIG. 4 illustrates schematically registration procedures at the first and second networks, maintained by two different M2M providers.

In both networks 201 and 202 registration procedures take place, in principle without mutual interference to eachother. FIG. 4 illustrates the registration sequence of the Device application 141-1 via the "dIa" reference point 161.

FIG. 4 indicates the sequences as an example in ETSI M2M primitives:

A first step is an application registration of DA1 141-1 with the DSCL1 131-1;

the 401-1: a registration request from DA1 141-1 to DSCL1 131-1: CREATE <sclBase for DSCL1>/applications,

402-1: a response to the request from DSCL1 131-1 to DA1 141-1: STATUS_CREATED, indicating the creation of a <sclBase for DSCL1>/applications/DA1.

A next step is the SCL registration of the DSCL 131-1 with the NSCL1 134-1 via the "mId" reference point 181;

405-1: a registration request from the DSCL1 131-1 to the NSCL 134-1: CREATE <sclBase for NSCL1>/scls,

406-1: a response to the request from NSCL1 134-1 to DSCL1 131-1: STATUS_CREATED, indicating the creation of <sclBase for NSCL1>/scls/DSCL1

407-1: request for an indication from DSCL1 131-1 to NSCL1 134-1: RETRIEVE <sclBase of NSCL1>,

408-1: response to the request from NSCL1 134-1 to DSCL1 131-1: STATUS_OK.

The result of the procedures shown are the creation of: the resource . . . /<sclBase for DSCL1>/applications/DA1 in DSCL1 131-1, and the resource . . . /<sclBase for NSCL1>/scls/DSCL1 in NSCL1 134-2.

The result of the sequences as exploited in FIG. 4 are presented in FIGS. 3A and 3C, showing the created application and scls resource structures in the DSCL1 131-1, as well as in the scls resource of the NSCL1 134-1 showed in FIG. 3B.

The registration sequences at the second network 202, indicated by reference signs 401-2 until 408-2 map mutatis mutandis to the signal flow reference signs 401-1 until 408-1.

The result of the procedures at the second provider's network 202 are: the resource . . . /<sclBase for GSCL2>/applications/D'A2 in GSCL2 133-2, and the resource . . . /<sclBase for NSCL2>/scls/GSCL2 in NSCL2 134-2

Registration in ETSI M2M is by definition a registration to the "local" SCL. The address of the SCL is obtained either during a bootstrap procedure or being provisioned. The "local" SCL is to be understood as the SCL first met in the topological pyramid in the direction to the top of the pyramid.

Note that the other entities: D'A1, GSCL1, NA1, DA2, DSCL2 and NA2 in FIG. 4 will also perform a registration procedure, but the steps are not described since they are not relevant to the specific example. Also note that the steps above can independently of eachother.

As part of the application registration procedure, the SCL where the resource is created, also designated as "local" or "hosting" SCL, will provide the Universal Resource Locator (URI) of the resources created.

The URI, provided by the hosting SCL, does not need to be public; the SCL might provide a private URI which is only valid in the device domain, M2M network or in the local area network of the gateway. The applications may just register locally to a DSCL or GSCL, but the DSCL or GSCL is not registered to an NSCL yet.

When the steps listed above according to the example are performed, the entities:

DA1 141-1 and DSCL1 131-1 are reachable within the M2M network 201 of the first M2M Service Provider;

DA1 141-1 is known to DSCL1 131-1 and vice-versa;

DSCL1 131-1 is known to NSCL1 134-1 and vice-versa;

D'A2 142-2 and GSCL2 133-2 are reachable within the M2M network 202 of the second M2M Service Provider;

D'A2 is known to GSCL2 and vice versa;

GSCL2 is known to NSCL2 and vice versa.

DA1 141-1 and DSCL1 131-1 are not known in the M2M network of second M2M service provider of M2M network 202. Known methods to retrieve knowledge of their existence can only be obtained by so called out-of-band method, meaning that other communication means, e.g. like Short Message Service (SMS), e-mail, etc should be used.

Without the use of out of band methods DA1 141-1 and DSCL1 131-1 are not reachable from entities/applications within the second M2M Service Provider's M2M network 202. The same hold for D'A2 142-2 and GSCL2 133-2 for communication from within the first provider's network 201.

As to accomplish a communication between SCLs and/or applications in ETSI M2M networks the following request routing rules are to be performed regarding requests generated by an application and requests received by an SCL:

1) A DA routes M2M requests to its local SCL (GSCL or DSCL). Local is to be interpreted as its locally present SCL or when not present, the first higher in the topological pyramid-like structure according to FIG. 1.
2) An NA routes M2M requests to its local SCL (NSCL). The Network node 121 by default has an NSCL 134.
3) A DSCL or GSCL that receives an M2M request that is not addressing resources available at the SCL itself, forwards the request to its local SCL (Which is the NSCL 134 according to FIG. 1). A local SCL is be interpreted as the first higher in the topological pyramid-like structure according to FIG. 1.
4) A DSCL, GSCL or NSCL that receives an M2M request, wherein the URI comprised by the request is subordinate to the URI of a local application resource, routes this requests to the local application in case retargeting is enabled by the application by providing an aPoc (application Point of contact).

As an example: A request to a target ID represented by: <sclbase of GSCL1>/applications/DA1/<apocpath> or one of its subordinates is routed to the aPoc of application DA1, if apocpath is one of the paths indicated in the aPocPath attribute and there is an aPoC attribute defined.

The aPoc is a URI that identifies how request are re-targeted) and aPocPath (Path for possible re-targeting under aPoc) attributes in the local application resource.

The aPocPaths, if present, is used to determine if a targetURI is to be re-targeted, by doing a prefix match against the elements in the path. Each path can optionally have an accessRightID associated with it, which, if present, is used for authorization purposes when doing the retargeting.

The accessRightID of the best matching path prefix is used for this purpose. The value of aPoCPaths is only relevant when the aPoC attribute is also present.

5) An NSCL that receives a request that is not addressing a resource on the NSCL itself, forwards the request to an SCL that has registered to the NSCL based on the link attribute in the SCL resource representing the registration. It uses the information in the M2M Point of Contact (m2mPoc) to route the request to the SCL.

An M2MPoC provides the set of information needed to reach an SCL from a network perspective. Typically an M2MPoC
   contains information that is e.g. resolved into a network address.

Additional to these five rules listed above, the rule stated below is suggested as to enable inter-network announcing of SCLs and Applications.

6) An SCL that receives a request that is not addressing a local resource and for which the previous rules do not apply, shall check if there is a announced resource located in this SCL which has a link-attribute that is prefix of the URI in the request (targetID). If a match is found, it can be deduced that the URI target does belong to another SCL, possibly in the network of another M2M service provider, based on the rules stated above, and the announced resource represents the link to the another network. There may also exist a possibility that a DSCL is located behind (seen from the top of the pyramid) a GSCL.

On this match the SCL routes the request to the SCL corresponding to the SCL resource under which the announced resource is located.

The term "announcing" is to be understood as the creation of an announced resource in another SCL as where the original resource is created, currently for the ease discovery resources.

The resources that can be announced have an "announceTo" attribute, describing in which SCLs announced resources may be created. As an example, if in <sclBase for NSCLX> a resource is created with the attribute "announceTo"=GSCLA, then in the resource <sclBase for GSCLA>/scls/NSCLX/scls, an announced resource referring to NSCLX is created as well.

The M2M inter-service initialisation uses the announced resources to also make the remote resources both discoverable and reachable from the "announcedTo" SCL. Resources in the NSCL 134-2 of the M2M network of the second M2M service provider are reachable if the NSCL in that M2M network registered with the NSCL in the M2M service provider 1 M2M network. Resources in other SCLs residing in the M2M network of the second M2M service provider, serving M2M network 202, are now routable from M2M network 201 of the first M2M service provider, when announced in the M2M network of the first M2M service provider serving M2M network 201.

However for cases where rule 6) above does not provide a match a next rule 7) is introduced:

7) Repeat part of rule 6; "An SCL that receives a request that is not addressing a local resource and for which the previous rules 1-5 do not apply, shall check if there is a announced resource located in this SCL which has a link-attribute that is prefix of the URI in the request (targetID)"

If no match is found, as there is either no announced resource nor a matching announced resource, it might be deduced that the URI target does belong to another network, based on the rules stated above, and an process can optionally be started to check for other networks.

When an NSCL1 134-1 in M2M network 201 needs to reach NSCL2 134-2 in M2M network 202, it needs to perform a mutual registration procedure which can be executed by:

a)—Provision of the network: i.e. statically: the NSCL 134-1 in M2M network 201 registers with the NSCLs in all the M2M networks with which the first M2M service provider, serving M2M network 201, has an agreement. All the information for mutual registration (addresses, keys, ids etc.) can be preprovisioned, or b)—An on demand registration scenario when a request is received: i.e. demanding that when an NSCL receives a request not targeting local resources or subordinate resources of local resources and for which there is no registered or announced resource as described in the routing rules listed above, then the NSCL shall perform a DNS lookup on the Fully Qualified Domain Name (FQDN) in the targetID. The DNS lookup will have to give the address of the NSCL2 as resources in M2M network 202 behind the remote NSCL2 are not supposed to be available as A or AAAA records in DNS. On demand can be applied as a first time that an address of an SCL or application residing in M2M network 202 is requested or on demand basis.

The other information needed for mutual registration is the NSCL-id of the remote SCL. This information can either be:

looked up in a table providing the mapping between FQDN and NSCL-id.

Figure 5:
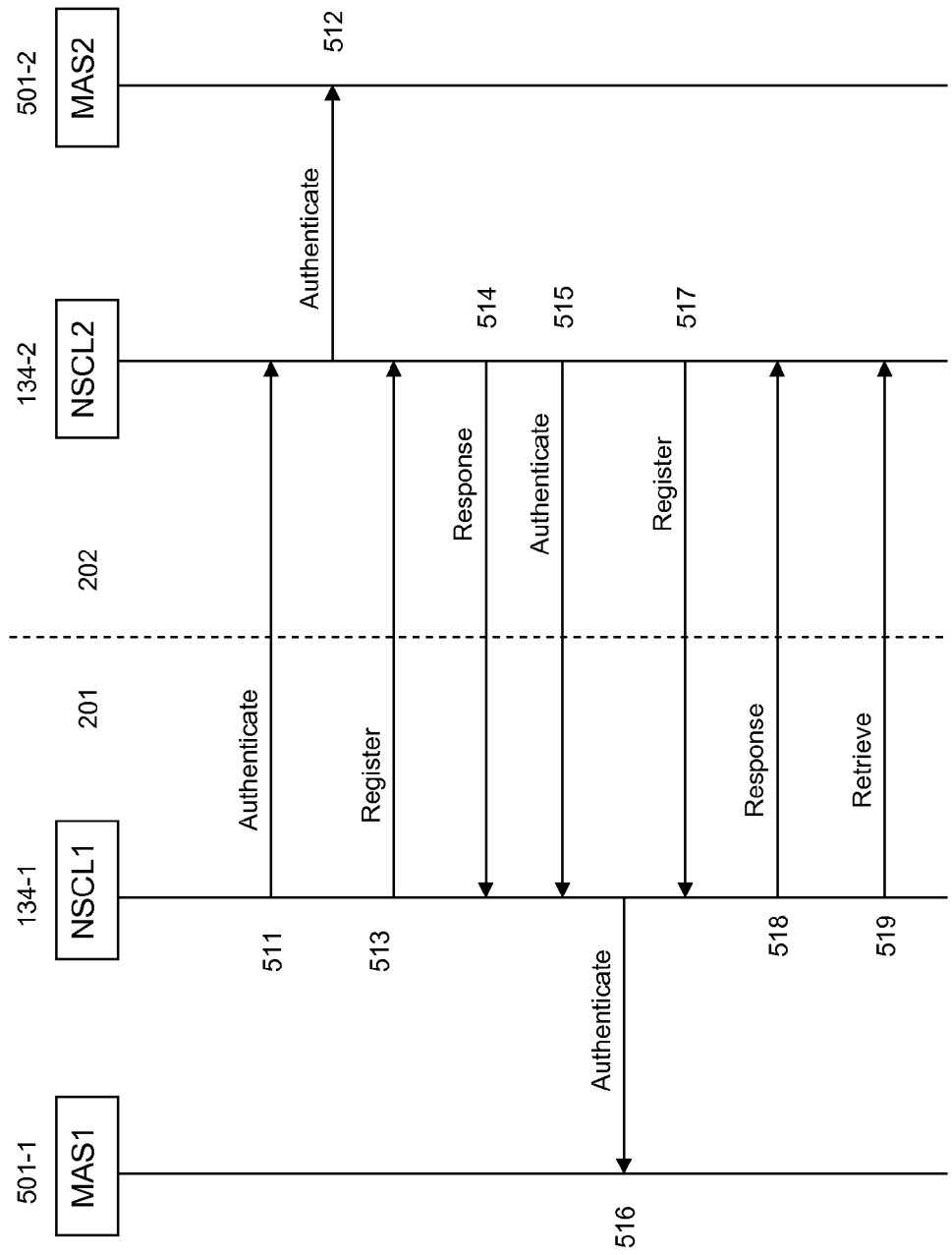
FIG. 5 illustrates schematically a mutual registration procedure between the NSCLs of two different M2M networks.

FIG. 5 illustrates schematically a mutual registration procedure of NSCLs of different M2M networks. An adapted DSCL or GSCL registration method is applied to have NSCL mutually registered.

Mutual authentication of the two endpoints, NSCL1 134-1 and NSCL2 134-2 is required for secure authenticated connectivity.

The steps performed in the mutual registration are listed below:

511-512: NSCL1 initiates an authentication to NSCL2 for secure authenticated connectivity In order to perform this mutual authentication an M2M Root Key (Kr) needs to be provisioned in NSCL1 134-1 and also in the M2M Authentication Server (MAS2) 501-2 associated to NSCL2 134-2. Replies by MAS2 on succesful authentication will be sent to NSCL1 and NSCL2 (not shown).

513: NSCL1 registers with NSCL2 by means of sclCreateRequestIndication <sclBase for NCSL2>/scls/NSCL1.

514: NSCL2 responds with sclCreateResponseConfirm STATUS_CREATED.

In order for the registration to be mutual, as a result of the registration procedure started by NSCL1 134-1, the NSCL2 134-2 will create a correspondent resource <sclBase for NSCL1>/scls/NSCL2. This part of the procedure differs from the SCL registration procedure for a DSCL or GSCL registration, the registering SCL (NSCL1) does not create by itself a resource representing the registeringTo SCL (NSCL2), but NSCL1 expects NSCL2 to register in response to the registration request of NSCL1.

515-516: representing the equivalent steps 511-512 whhere NSCL2 initiates.

517: NSCL2 registers with NSCL1 by means of sclCreateRequestIndication <sclBase for NCSL1>/scls/NSCL2.

518: NSCL1 responds with sclCreateResponseConfirm STATUS_CREATED.

519: After the mutual NSCL registration is completed, NSCL1 sends the original request of DA1 to NSCL2 as to retrieve the <sclBase for NSCL2>/scls/GSCL2/applications/D'A2.

The order of NSCL1 initiating, followed by NSCL2 as depicted in FIG. 5, may as well be in the other sequence having NSCL2 initiating.

As to handle announcements to another M2M network current announcement procedures shall be enhanced. Specifically:

It shall be possible to announce an SCL resource.
When an SCL (the local SCL) receives a request to initiate an announcement procedure (by manipulating the "announceTo" attribute of the announcing resource), three alternatives may apply:
a) If the local SCL itself is already registered to the announce-to SCL, or if the announce-to SCL is registered to the local SCL, an announcement procedure is initiated,
b) If the local SCL is already announced to the announce-to SCL, announcement procedure is initiated,
c) if neither a) nor b) is the case, then the announcing SCL will trigger an announcement procedure to the announce-to SCL by adding the announce-to SCL to its announceTo attribute in its local SCL registration. This means that SCLs in the chain between the announcing SCL and the announced-to SCL will either be registered or announced in the announced-to SCL when the procedure completes.

If the announcing SCL is itself announced in the announce-to SCL, then it shall create the announced resources in the appropriate collection resource that resides under its announced resource.

e.g., When GSCL2 133-2 is triggered to announce D'A2 142-2 in NSCL2 134-2, then GSCL2 will be announced in NSCL2 as <sclBase for NSCL2>/scls/NSCL2/scls/GSCL2 annc, and the announced resource for D'A2 will be created in NSCL1 as <sclBase for NSCL1>/scls/NSCL2/scls/GSCL2 annc/applications/D'A2annc.

Figures 6A, 6B, 6C:
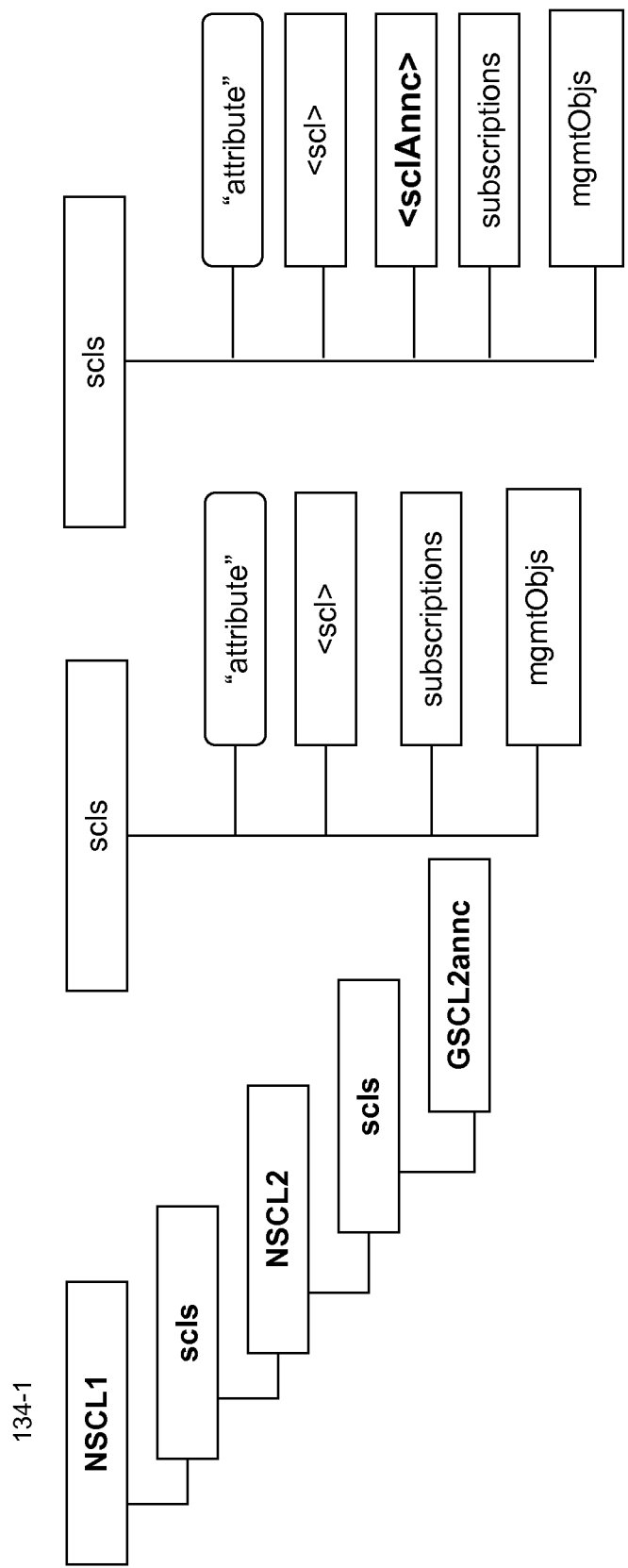
FIG. 6A illustrates schematically a part of the RESTful architecture of an NSCL where GSCL2 is present as an announced resource.
FIG. 6B illustrates schematically the Current RESTful structure for an scls resource.
FIG. 6C illustrates schematically the amended RESTful structure for an scls resource.

FIG. 6A illustrates schematically a part of the ETSI M2M applied RESTful architecture of an NSCL where GSCL2 is present as an announced resource.

FIG. 4B represents that the following steps have been performed as basis for the example below.

NSCL2 has registered to NSCL1, with a reasource under scls of NSCL1.
GSCL2 has registered to NSCL2, with an attribute to be announced with NSCL1, causing a) a registration in NSCL2 (not present in <sclBase for NSCL1, as not being created when NSCL2 registers with NSCL1), and b) an announcement in the NSCL1 rousource having NSCL2 as grandparent. The announced resource is presented as "GSCL2 annc".

When a request is received in NSCL1 that is targeting <sclBase for GSCL2 >, where the announced resource exists in <sclBase for NSCL1>/scls/NSCL2/scls/GSCL2 annc as shown. Since the link attribute in GSCL2 annc matches <sclBase for GSCL2 >, the request is forwarded to the entity representing NSCL2. I.e., to <sclBase for NSCL2>, based on the routing information associated with NSCL2 (i.e., the m2mPoc information associated with NSCL2).

FIG. 6B illustrates schematically the current ETSI M2M scls collection resource in an SCL. The indicated <scl> resource represents a collection of 0 or more <scl> resources, such as DSCL1 in FIG. 3B.

FIG. 6C illustrates schematically the amended ETSI M2M scls collection resource in an SCL, as to support a resource indicating the announced resource (originally residing in its hosting SCL) for enabling inter-service M2M communication.

It is suggested to indicate this announced resource by <sclAnnc> which can occur 0 or 1 time in an scls resource.

Introduced resource <sclAnnc> shall represent an active announcement of an SCL in another SCL that is not its registered-to SCL or the SCL it registered from. The <sclAnnc> resource keeps a link to the original resource. That will also be the reference returned during discovery.

The <sclAnnc> resources contains sub-resources for applications, scls, containers, groups, and accessRights collection resources. This allow the creation of these types of resources (container/group/accessRight) with a lifetime and scope that are linked to the announced resource. Resources created as descendants of the announced resource will automatically be deleted when the scl is de-announced or when the announcement expires.

It shall be the responsibility of the announcing SCL to keep the accessRightID and the searchStrings in sync with the resource that is announced.

In the example of DA1 141-1 requesting to receive data from GSCL2 133-2, which has been sourced by Device D'A2 142-2, NSCL1 134-1 comprises an announced resource <sclBase for NSCL1>/scls/NSCL2/scls/GSCL2 annc/applications/D'A2annc that represents in its resource collection the link to the original resource representing D'A2.

Figure 7:
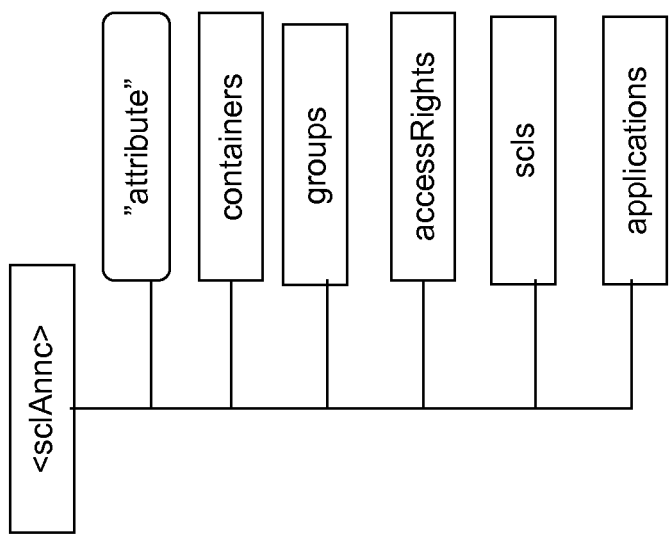
FIG. 7 illustrates schematically the structure of introduced resource "sclAnnc".

FIG. 7 illustrates schematically the structure of introduced resource <sclAnnc>, with its subordinate resources.

The following rules apply:

<sclBase for scl1>/scls/<scl2> announced on <sclBase for scl3> as <sclBase for scl3>/scls/<scl1>/scls/<scl2Annc>

Where <scl122 is the resource created when <sclBase for slc11> registeres with <sclBase for scl3>. The announcing SCL shall suggest the name of the announced resource as the concatenation of the name of the announcing resource with the suffix "Annc" i.e. <scl>Annc.

The ETSI M2M <scl> resource has been added with an attribute resource named "announceTo" with a multiplicity of 0 or 1.

The <applicationAnnc> resource as defined in ETSI M2M TS 102 690 shall be extended with resources "scls" and "applications" as shown in table 1 below.

TABLE 1

Reference: Table 9.13 of ETSI M2M TS 102 690 v1.1.1:
Structure of <applicationAnnc> resource

| subResource | Multiplicity | Description |
| --- | --- | --- |
| containers | 1 | See clause 9.2.3.11. Contains a mix or containerAnnc and container resources. |
| groups | 1 | See clause 9.2.3.18. Contains a mix of groupAnnc and group resources. |
| accessRights | 1 | See clause 9.2.3.8. Contains a mix of accessRightAnnc and accessRight resources. |
| scls | 1 | Contains sclAnnc resources only |
| applications | | Contains applicationAnnc resources only |

Figure 8:
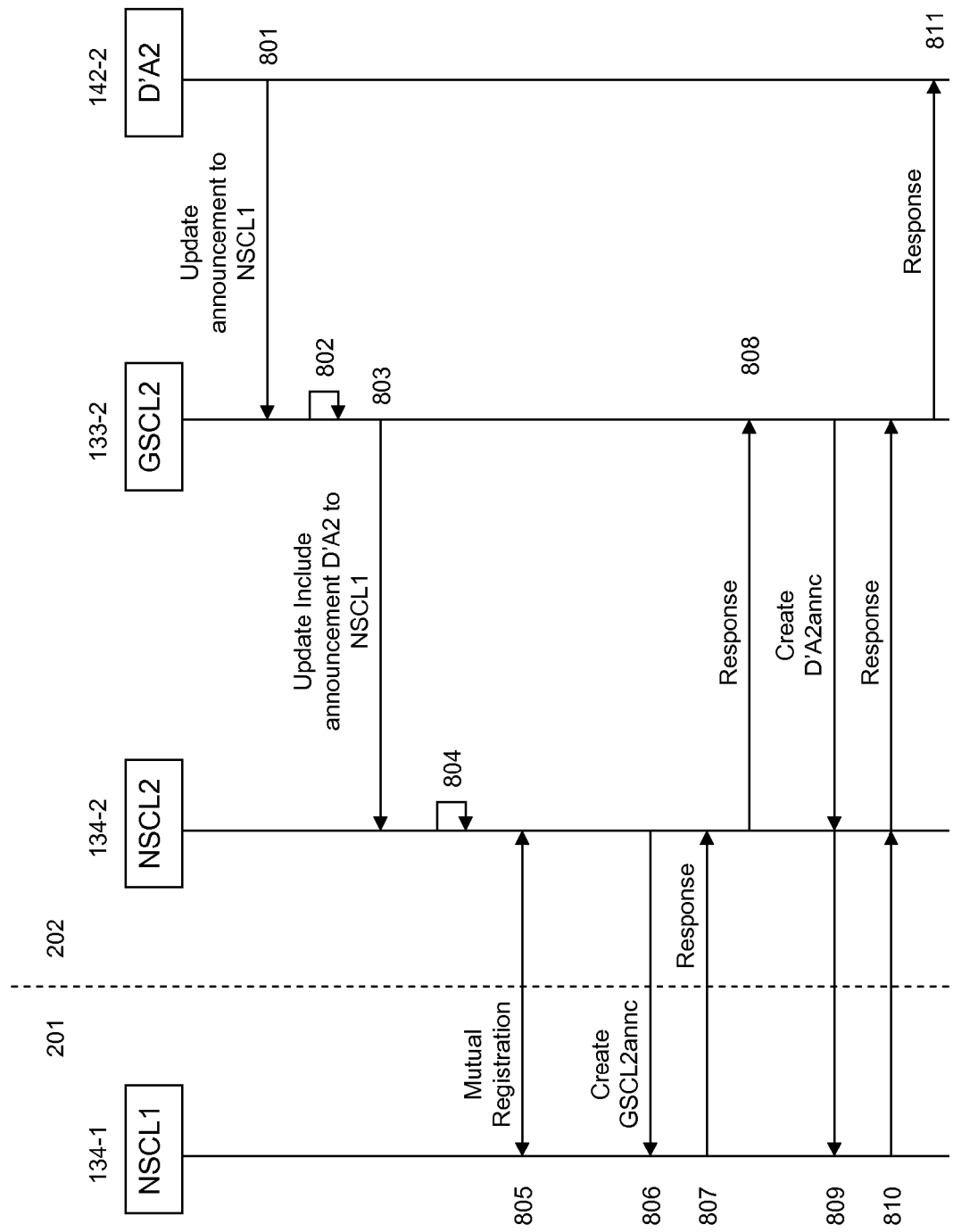
FIG. 8 illustrates schematically the flow of messages, as to have Device application D'A2 be announced to NSCL1.

FIG. 8 illustrates schematically the flow of messages, as to have Device application D'A2 be announced to NSCL1. With reference to FIG. 8, the steps are explained below.

801—D'A2 triggers announcement of it resources to NSCL1, by including the <sclBase for NSCL1> URI in the announceTo of its application resource in GSCL2 by request message: applicationUpdateRequest Indication <sclBase of GSCL2 >/applications/D'A2 update announceTo to include <sclBase for NSCL1>.

802—As the GSCL2 detects that it is not registered nor announced to NSCL1, GSCL2 triggers announcement of itself as described in step 803. If GSCL2 was already announced to NSCL1, the sequence would have continued with step 810.

803—GSCL2 triggers announcement of its resources to NSCL1, by including the <sclBase for NSCL1> URI in the announceTo of its scl resource in NSCL2 with request message: sclUpdateRequest Indication <sclBase for NSCL2>/scls/GSCL2 update announceTo to include <sclBase for NSCL1>.

804—If NSCL2 is registered with NSCL1 and vice versa, the request can be routed according to step 806. If not yet registered or the on-demand mutual NSCL registration is enabled, continue with step 805.

805—Mutual registration of the NSCLs. See FIG. 5 description.

806—After mutual registration, the request can be routed by NSCL2 towards NSCL1 based on the m2mPoc of NSCL1. Since NSCL2 is registered in NSCL1 now, it does not have to announce itself to NSCL1. NSCL2 initiates creation of an announced resource for GSCL2 in <sclBase for NSCL1> with the request message: slcAnncCreateRequestIndication <sclBase for NSCL1>scls/NSCL2/scls.

807—The announced resource is created and a reply message from NSCL1 is sent to NSCL2: STATUS CREATED.

808—NSCL2 responds with a STATUS OK reply message to GSCL2 on the request initiated in step 802.

809—Since GSCL2 is announced in NSCL1, it can create the announced resource in NSCL2 at the correct location. The request is sent to NSCL2 based on routing rule 3 and forwarded by NSCL2 to NSCL1 based on routing rule 5. GSCL2 transmits the request message: applicationAnncRequestIndication <sclBase for NSCL1>/scls/NSCL2/scls/GSCL2annc/applications, thereby creating DA2annc in <sclBase for NSCL1>.

810—Creation of the announced resource succeeds. Reply message from NSCL1 to NSCL2 and forwarded to GSCL2: STATUS CREATED 811—GSCL2 responds to the D'A2 with a STATUS OK on the request that triggered the announcement in step 801.

Please note that the schematic flow of FIG. 8 shows a synchronous handling of the request. However, in practice, the SCLs may do the announce procedure in an asynchronous way, first responding on the xxxUpdateRequestIndication message and then initiating the createxxxAcnncRequestIndication message, where xxx denotes either "application" or "scl" depending whether an application or an SCL has to be announced.

Figure 9:
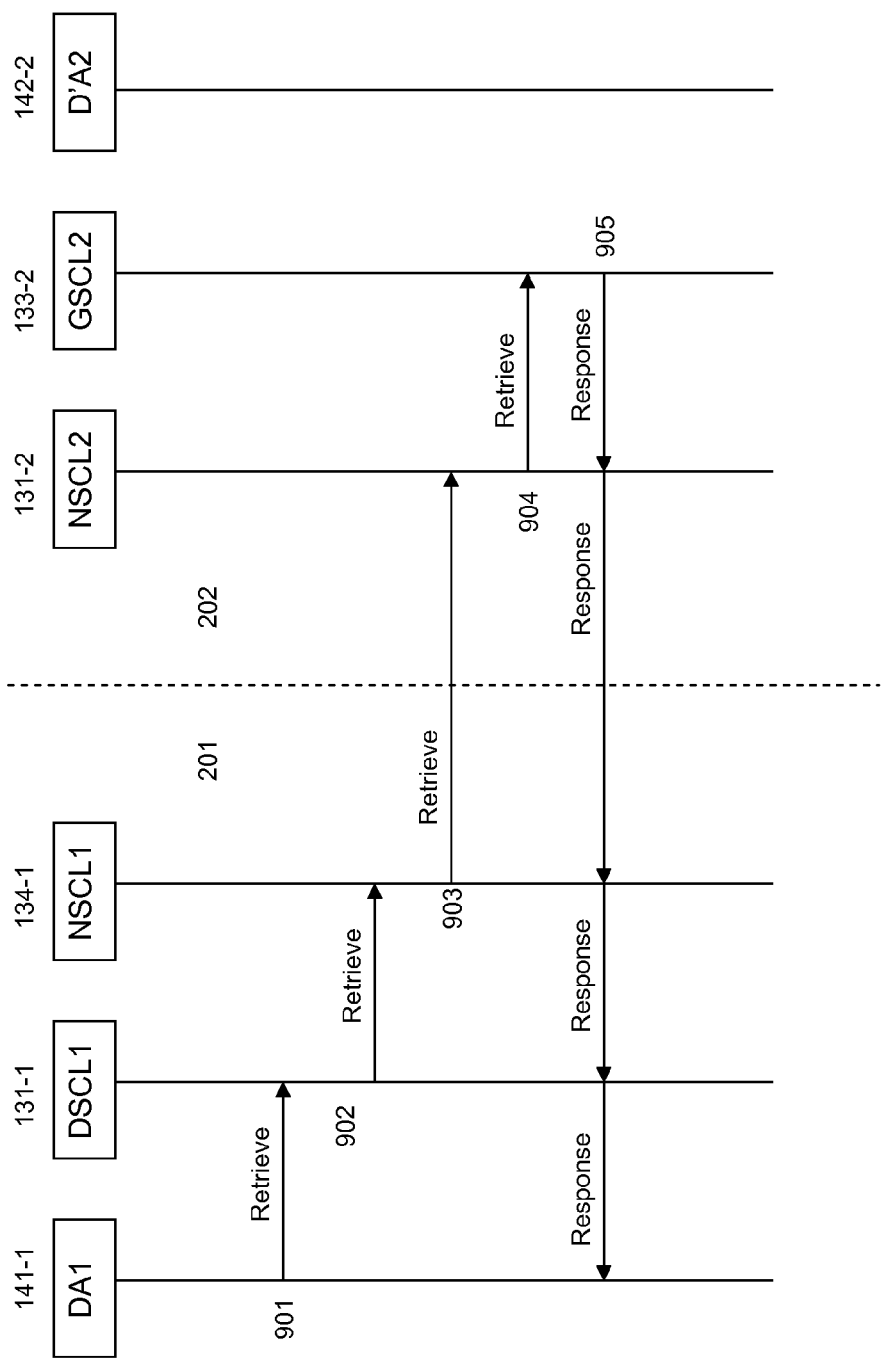
FIG. 9 illustrates schematically the flow of messages, wherein a routing flow between a requesting entity 141-1 in M2M network 201 retrieves data from entity 142-2 residing in M2M network 202.

FIG. 9 illustrates schematically the sequebnce of messages, wherein a routing sequence between a requesting entity 141-1 in M2M network 201 retrieved data from application D'A2 142-2 residing in M2M network 202.

With reference to FIG. 9, the steps are explained below. Just as that GSCL2 can be announced in NSCL1, an application D'A2 can as well announce. If DA1 only has knowledge of the identifier identifying D'A2, so not knowing at which GSCL D'A2 is registered, a request to application D'A2 can routed based on an announced resource in NSCL1 by the same method explaned above for GSCL2. FIG. 9 explaines how an application may announce in NSCL1.

901—The M2M Device Application DA1 141-1 sends a request to a resource residing in GSCL2 133-2, since DA1 would like to retrieve information about D'A2 142-2. The request will address a resource with an URI starting with <sclBase for GSCL2 >/applications/D'A2. The request is routed to the local Service Capability Layer DSCL1 131-1 based on routing rule 1.

902—The addressed resource in not residing in the DSCL1, the request is forwarded to its local SCL, being NSCL1 134-1. Based on routing rule 3

903—The addressed resource is not residing in the NSCL1 and the URI is not matching any registered SCL. However, the URI in the request matches an announced resource <sclBase for NSCL1>/scls/NSCL2/scls/GSCL2. Therefore, according to rule 6, the request is forwarded to NSCL2 134-2. The stored m2mPoc information from NSCL2 is used to forward the request to NSCL2.

904—NSCL2 forwards the request to GSCL2 133-2, based on routing rule 5

905—GSCL2 will checks the accessRight and it will allow or reject the access to the resource. In order to allow DA1 to access the addressed resource, as a precondition DA1 has to be added to the accessRights associated to the resource.

FIG. 10A illustrates schematically a Network node, also denoted as network server, network node or network domain 121.

Network node 121 comprises an NSCL 134 comprising;
10A1: processing unit for receiving, processing and generating requests and replies.
10A2: storage medium applied for storing e.g resources of the SCLs and programs and variables for processor 10A1.

Optionally network node 121 further comprises Network application 145 comprising:
10A3: application entity in software and/or hardware form.
10A4: storage medium applied for information, programs and variables for application 10A3.

Application entity 145 is communicatively connected to NSCL 134 via interface, reference point, "mIa" 171. Application 145 and NSCL 134 can be housed in one node or housed in separate co-located nodes, albeit connected via interface "mIa" 171.

Network node 121 is communicatively connected to its environment via interface "mId" 181 typically to SCLs of other network entities within the same M2M network domain, and "mIn" 210 typically communicatively connected to one or more NSCLs.

Additional interface 10A5 can be used for processor access for e.g. monitoring, provisioning, etc.

FIG. 10B illustrates schematically a Device 102 or Gateway 111 entity respectively.

As Devices and Gateways constitute generally the same structure, these entities are explained in a single figure, pointing out differences in the text below.

The Device 102 or Gateway 111 node comprises:
Device 102 and Gateway 111 comprise a DSCL 131 and GSCL 133 respectively. The DSCL 131 and GSCL 133 comprising:
10B1: processing unit for receiving, processing and generating requests and replies.
10B2: storage medium applied for storing e.g resources of the SCLs and programs and variables for processor 10A1.

Optionally DSCL 131 and GSCL 133 entities further comprise a Device application 141 and a Gateway application 144 respectively, the
Device- and Gateway application comprising:
10B3: application entity in software and/or hardware form.
10B4: storage medium applied for information, programs and variables for application 10A3.

Application 141 and 144 are communicatively connected to DSCL 131 and GSCL 133 respectively via interface, reference point, "mIa" 161 and 162 respectively. Application 141, 144 and DSCL 131, GSCL 133 can be housed in one node or housed in separate co-located nodes, albeit connected via interfaces "mIa" 161 and 162 respectively.

DSCL 131 and GSCL 133 are communicatively connected to the environment via interface "mId" 181 typically to SCLs of other network entities within the same M2M network domain.

Additional interface 10B5 can be used for processor access for e.g. monitoring, provisioning, etc.

Difference between a Gateway 111 and a Device 102 node is that a Device node does not have to have an local SCL. Device node 104 (see FIG. 1) is an example of a device with an application 142, but without local SCL, using the GSLC of a communicatively connected gateway node 111 via interface, or reference point "dIa" 164.

The solution as discussed has a number of conceivable advantages. The invention enabling M2M interservice communication, and defining a new procedure for a mutual registration between NSCLs from different M2M Service Provider domains has the following advantages:

Re-use of authentication mechanism (key based) for the new reference point "mIn".

Re-use of mechanisms for setting a M2M secure channel for the new reference point "mIn".

Usage of the concept of announcement to spread the knowledge of remote resources Inter-M2M Service Provider communication is required for permitting devices and applications to provide and receive information from other devices and applications belonging to another M2M Service provider. It is regarded to become a challenge as many M2M Service Providers, organized as verticals, are required to cooperate for the users' needs.

Allowing control of which resources are discoverable using announce and discover procedures.

Allowing the application to address the announced resource and all its subordinate URIs as if it was addressing the local resources. The further routing of the requests is handled by the system according to established procedures.

Inter-M2M Service Provider communication is required for permitting devices and applications to provide and receive information from other applications that are belonging to the another M2M Service provider, which will be a challenge as many M2M Service Providers, organized as verticals, are required to cooperate for the users needs.

What is claimed is:

1. A method performed by a network node configured for operation as a first Network Services Capability Layer (NSCL) entity in a first Machine-to-Machine (M2M) Service Provider network, the method comprising:
   receiving a M2M request from an M2M entity within the first M2M Service Provider network, said M2M request including a Universal Resource Identifier (URI) identifying a targeted M2M resource;
   responsive to determining from the URI that the targeted M2M resource belongs to the first M2M Service Provider network, servicing the M2M request locally within the NSCL entity, or otherwise forwarding the M2M request within the first M2M Service Provider network, for servicing by another M2M entity within the first M2M Service Provider network; and
   responsive to determining from the URI that the targeted M2M resource belongs to a different, second M2M Service Provider network that is registered at the first NSCL entity, forwarding the M2M request towards a second NSCL entity of the second M2M Service Provider network.

2. The method of claim 1, further comprising determining from the URI that the targeted M2M resource belongs to the second M2M Service Provider network by determining that a prefix portion of the URI matches domain or path information of the second M2M Service Provider network, as stored in registration information at the first NSCL entity.

3. The method of claim 1, further comprising determining from the URI that the targeted M2M resource belongs to the second M2M Service Provider network by determining that the M2M request targets an announced M2M resource of the second M2M Service Provider network, as previously announced by the second NSCL entity at the first NSCL entity.

4. The method of claim 1, further comprising, responsive to determining from the URI that the targeted M2M resource belongs to a different, third M2M Service Provider network that is not registered at the first NSCL entity:
   performing a Domain Name System (DNS) lookup on a Fully Qualified Domain Name (FQDN) known from the URI of the M2M request;

initiating a mutual registration procedure towards a third NSCL entity of the third M2M Service Provider network, using addressing information obtained from the DNS lookup; and upon successful mutual registration, forwarding the M2M request towards the third NSCL entity.

5. The method of claim 1, further comprising registering the second M2M Service Provider network according to a mutual registration procedure by which the first and second NSCL entities register with each other.

6. The method of claim 1, wherein, for the case where the targeted M2M resource belongs to the second M2M Service Provider network that is registered at the first NSCL entity, the method further includes receiving an M2M response from the second NSCL entity of the second M2M Service Provider network, and forwarding M2M response to the originating M2M entity of the first M2M Service Provider network.

7. A network node configured for operation as a first Network Services Capability Layer (NSCL) entity in a first Machine-to-Machine (M2M) Service Provider network, the network node comprising:

a communication interface circuit configured to receive a M2M request from an originating M2M entity within the first M2M Service Provider network, said M2M request including a Universal Resource Identifier (URI) identifying a targeted M2M resource; and a processing circuit configured to:
in response to determining from the URI that the targeted M2M resource belongs to the first M2M Service Provider network, service the M2M request locally within the NSCL entity, or otherwise forward the M2M request within the first M2M Service Provider network, for servicing by another M2M entity within the first M2M Service Provider network; and in response to determining from the URI that the targeted M2M resource belongs to a different, second M2M Service Provider network that is registered at the first NSCL entity, forwards the M2M request towards a second NSCL entity of the second M2M Service Provider network.

8. The network node of claim 7, wherein the processing circuit is configured to determine from the URI that the targeted M2M resource belongs to the second M2M Service Provider network by determining that a prefix portion of the URI matches domain or path information of the second M2M Service Provider network, as stored in registration information at the first NSCL entity.

9. The network node of claim 7, wherein the processing circuit is configured to determine from the URI that the targeted M2M resource belongs to the second M2M Service Provider network by determining that the M2M request targets an announced M2M resource of the second M2M Service Provider network, as previously announced by the second NSCL entity at the first NSCL entity.

10. The network node of claim 7, wherein, responsive to determining from the URI that the targeted M2M resource belongs to a different, third M2M Service Provider network that is not registered at the first NSCL entity, the processing circuit is configured to:

perform a Domain Name System (DNS) lookup on a Fully Qualified Domain Name (FQDN) known from the URI of the M2M request;

initiate a mutual registration procedure towards a third NSCL entity of the third M2M Service Provider network, using addressing information obtained from the DNS lookup; and upon successful mutual registration, forward the M2M request towards the third NSCL entity.

11. The network node of claim 7, wherein the processing circuit is configured to register the second M2M Service Provider network according to a mutual registration procedure by which the first and second NSCL entities register with each other.

12. The network node of claim 7, wherein, for the case where the targeted M2M resource belongs to the second M2M Service Provider network that is registered at the first NSCL entity, and wherein the processing circuit is further configured to receive an M2M response from the second NSCL entity of the second M2M Service Provider network, and forward M2M response to the originating M2M entity of the first M2M Service Provider network.

* * * * *